United States Patent [19]

Nakajima

[11] Patent Number: 4,862,937

[45] Date of Patent: Sep. 5, 1989

[54] ANTISKID ATTACHMENT FOR AUTOMOTIVE WHEELS

[76] Inventor: Masahiro Nakajima, 6-23, Takigawa-cho, Yokkaichi-shi, Mie-ken, Japan

[21] Appl. No.: 193,825

[22] Filed: May 13, 1988

[30] Foreign Application Priority Data

May 20, 1987 [JP] Japan .................................. 62-123231

[51] Int. Cl.$^4$ .............................................. B60C 27/20
[52] U.S. Cl. ............................ 152/225 R; 152/213 A; 152/218
[58] Field of Search ........... 152/170, 179, 208, 213 R, 152/213 A, 217, 218, 219, 221, 222, 225 R, 214, 233, 234

[56] References Cited

U.S. PATENT DOCUMENTS 1,053,893  2/1913  Walter ................................. 152/233
2,529,427  11/1950  Snedeker ........................ 152/225 R
4,749,015  6/1988  Miyagawa ........................... 152/222

Primary Examiner—Michael W. Ball
Assistant Examiner—Gregory J. Wilber
Attorney, Agent, or Firm—Paul L. Sjoquist

[57] ABSTRACT

An antiskid attachment for use with an automotive wheel having a tire includes a base plate adapted to be positioned on one side of the wheel. A plurality of spaced-apart ground-engaging band members are mounted peripherally around the base plate in cantilevered manner and are adapted to be positioned on the outer surface of the tire. Each of the band members has a transverse hole formed in the free end thereof. A fastening cord is passed through the holes of the band members for releasably tensioning the band members. Tying means is provided for releasably tying the fastening cord to the outside surface of the base plate with the band members tensioned by the fastening cord.

2 Claims, 5 Drawing Sheets

ANTISKID ATTACHMENT FOR AUTOMOTIVE WHEELS

BACKGROUND OF THE INVENTION

1. Field of the Invention

The present invention relates to an antiskid attachment for automotive wheels, and more particularly to an antiskid attachement which prevents skidding of automotive wheels by increasing rolling resistance thereof.

2. Description of the Prior Art

Heretofore, tire chains have been employed to increase rolling resistance of automotive wheels when an automobile is to be driven on a slippery road such as a snowy road.

However, the conventional tire chains are so heavy and unwieldy that the operation to mount and remove the tire chains to and from the wheels is cumbersome, and thus requires much labor.

SUMMARY OF THE INVENTION

It is, accordingly, an object of the present invention to avoid the above noted disadvantage by providing a novel antiskid attachment which can be readily mounted to and removed from automotive wheels.

According to the present invention, there is provided an antiskid attachment for use with an automotive wheels having a tire thereon. The antiskid attachment includes a base plate adapted to be positioned on one side of the wheel, a plurality of peripherally spaced-apart ground-engaging band members mounted on the base plate in cantilevered manner and adapted to be positioned on the outer surface of the tire, each of the ground-engaging band members having a transversely extending hole formed in the free end thereof, a fastening cord passed through the holes of the ground-engaging band members for releasably tensioning the ground-engaging band members, and tying means for releasably tying the fastening cord to the outside surface of the base plate with the ground-engaging band members tensioned by the fastening cord.

The present invention will become more fully apparent from the claims and description as it proceeds in connection with the drawings.

DETAILED DESCRIPTION OF THE PREFERRED EMBODIMENT

Figure 1:
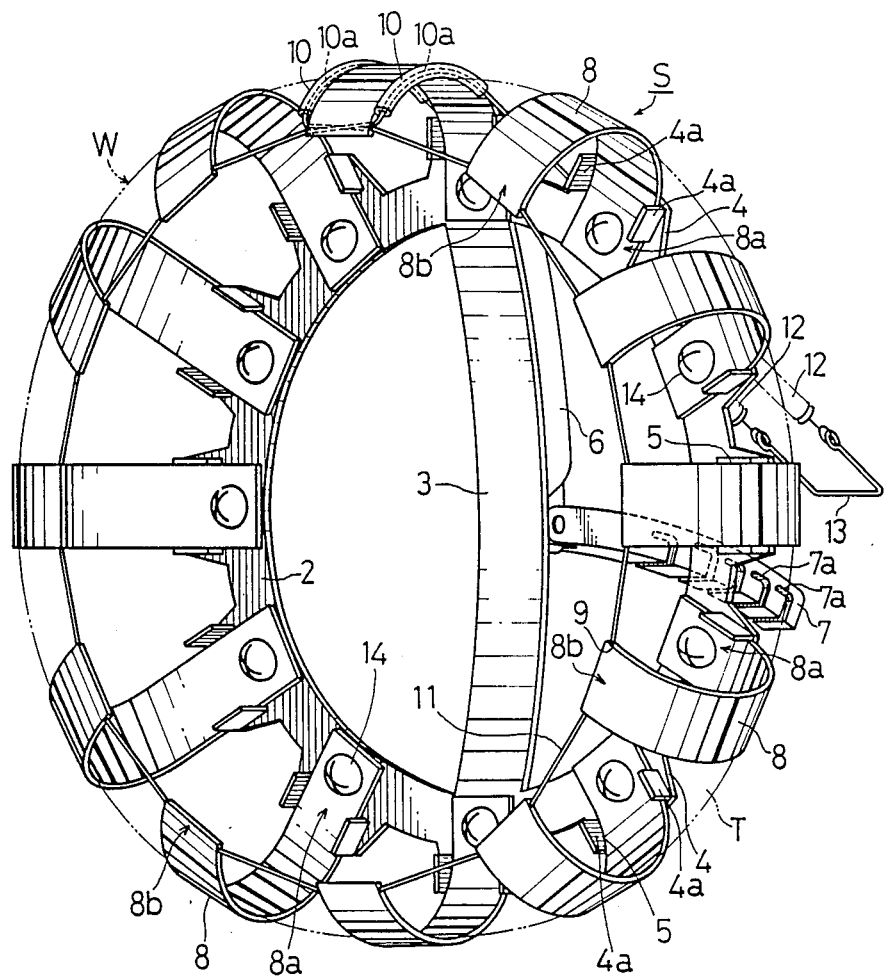
FIG. 1 is a perspective view of an antiskid attachment according to a preferred embodiment of the present invention.

Referring to the drawings in general, shown therein is an antiskid attachment S constructed in accordance with the present invention. As shown therein, the antiskid attachment S includes a base plate 1 adapted to be attached to the outside surface of an automotive wheel W. The base plate 1 includes a circular frame member 2 having a central opening therein, and an outwardly curved brace member 3 formed integrally with and extending diametrically of the frame member 2.

Figure 2:
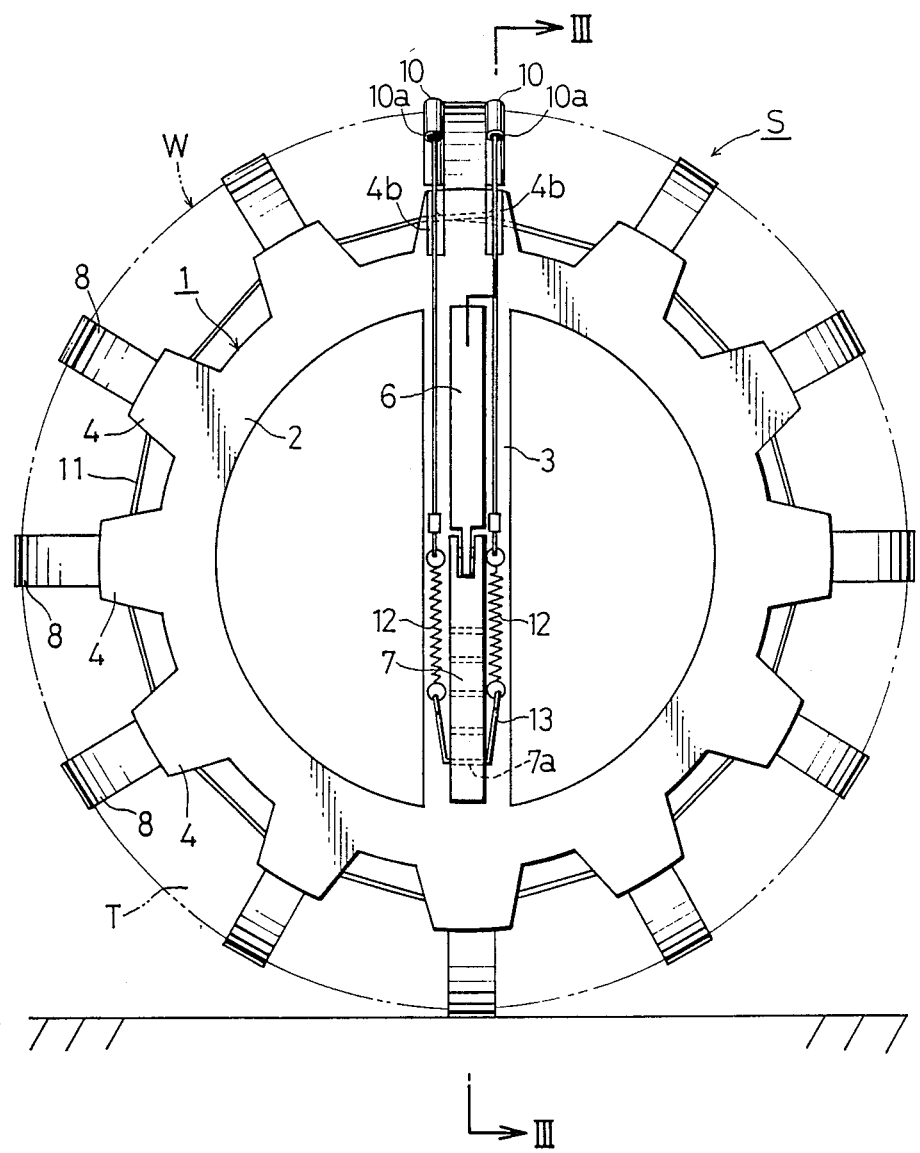
FIG. 2 is a front view of the antiskid attachment of FIG. 1.
Figure 3:
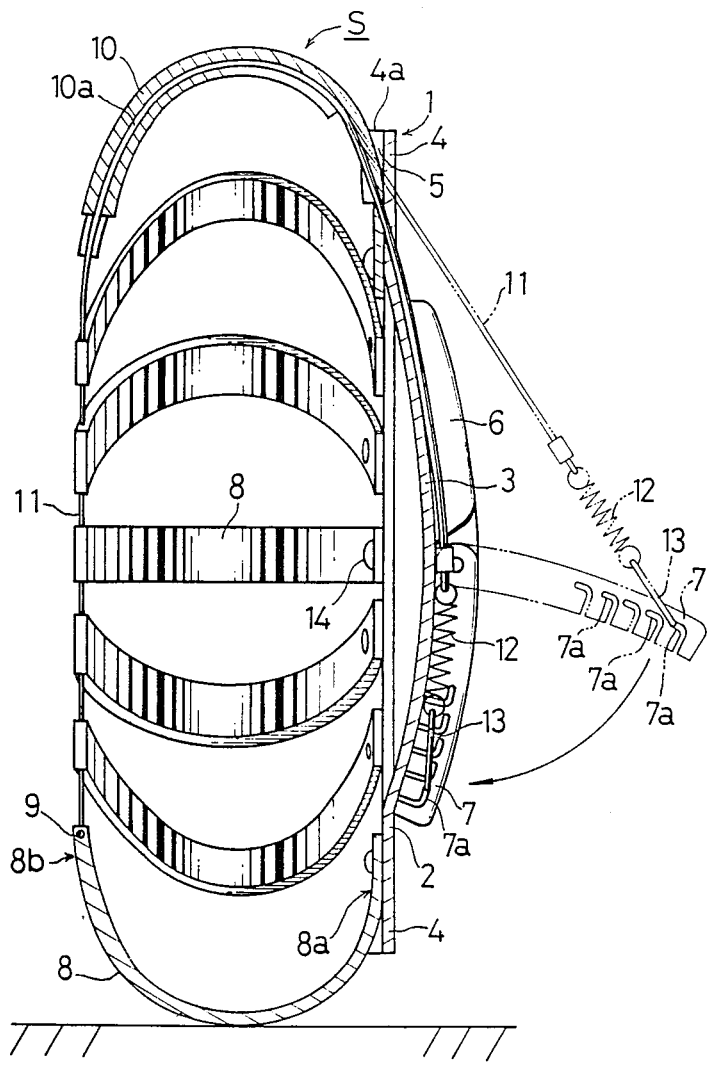
FIG. 3 is a sectional view taken along line III—III of FIG. 2.

The frame member 2 has a plurality of equally spaced projections 4 (12 of them shown in this embodiment) extending peripherally therearound. Each of the projections 4 has a pair of side plates 4a projecting inwardly from the opposite sides thereof, defining a restraining channel 5 having a substantially U-shaped configuration in cross section. As best shown in FIG. 2, one of the projections 4 which is located adjacent the upper end (as viewed in FIG. 2) of the brace member 3, has formed on the outside surface thereof a pair of parallel guide grooves 4b for guidingly receiving a fastening cord 11 to be hereinafter described.

A ridge member 6 is provided on the outside surface of the brace member 3 which extends longitudinally from one end to the medial portion of the brace member 3. An arm 7 is pivotally connected at one end to the lower end (as viewed in FIG. 2) of the ridge member 6 and has a plurality of L-shaped tying slots 7a formed adjacent the other end thereof.

A plurality of equally spaced ground-engaging band members 8 are mounted peripherally around the base plate 1. Specifically, the band members 8 are formed into an arcuately curved configuration to conform to the cross-sectional configuration of a tire T so as to circumscribe the tire T in the transverse direction thereof. The band members 8 are made of a resilient material, such as plastic material, with the capability of being flexed in the transverse direction of the tire T (considered when in use). Each of the band members 8 has a proximal end 8a fixed through a screw 14 to the inside surface of the frame member 2 inwardly of each projection 4 in cantilevered manner, such that the band member 8 will be tilted about the axis of the screw 14. The band member 8 is normally fitted in the restraining channel 5 adjacent the proximal end 8a and is restrained from tilting movement, and when the band member 8 is bent inwardly, it will be removed from the restraining channel 5 for tilting movement.

Each of the band members 8 has a free end 8b through which a transversely extending hole 9 is formed. Further, a pair of guide tubes 10 having a longitudinally extending through hole 10a are integrally attached to the opposite sides of one of the band members 8 which is disposed adjacent the upper end (as viewed in the drawings) of the brace member 3.

A non-flexible fastening cord 11 formed of metal wire is provided and is operatively associated with the free ends 8b of the band members 8. The task of the fastening cord 11 is to tension and release the band members 8 all together, thereby expanding and reducing the diameter of an inscribed circle touching internally of the tops of the band members 8. The fastening cord 11 is passed through the holes 9 of the band members 8 and is thus looped along the free ends 8b of the band members 8. The opposite ends of the fastening cord 11 are inserted in a crossing manner into the hole 9 of the upper band member 8, and are passed separately through the holes 10a of the guide tubes 10. Further, the ends of the fastening cord 11 are passed through the guide grooves 4b of the upper projection 4, and are drawn outwardly of the base plate 1. A spring 12 is fixed at one end to each end of the fastening cord 11. A generally U-shaped hooking member 13 is connected to the other ends of the spring 12 and is adapted to selectively engage the tying slots 7a of the arm 7.

The antiskid attachment S thus constructed is mounted to the wheel W as follows.

Figure 4:
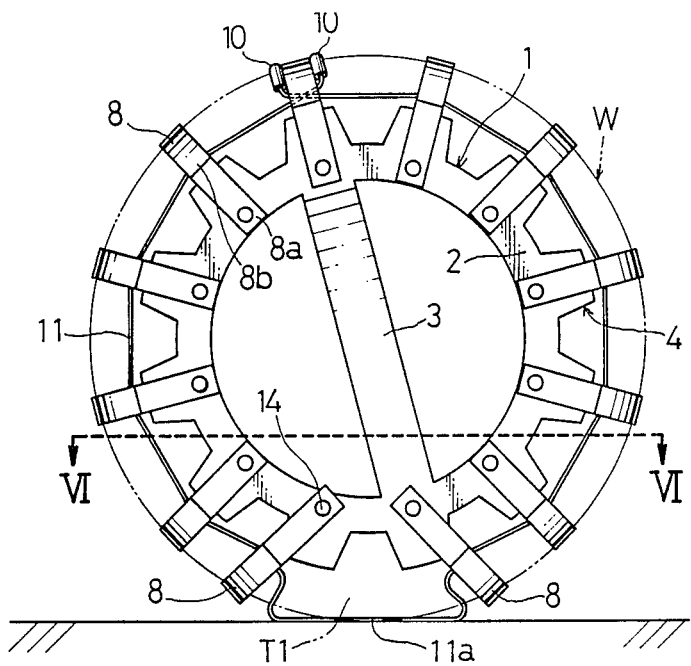
FIG. 4 is a rear view of the antiskid attachment, with the fastening cord temporarily tightened.
Figure 5:
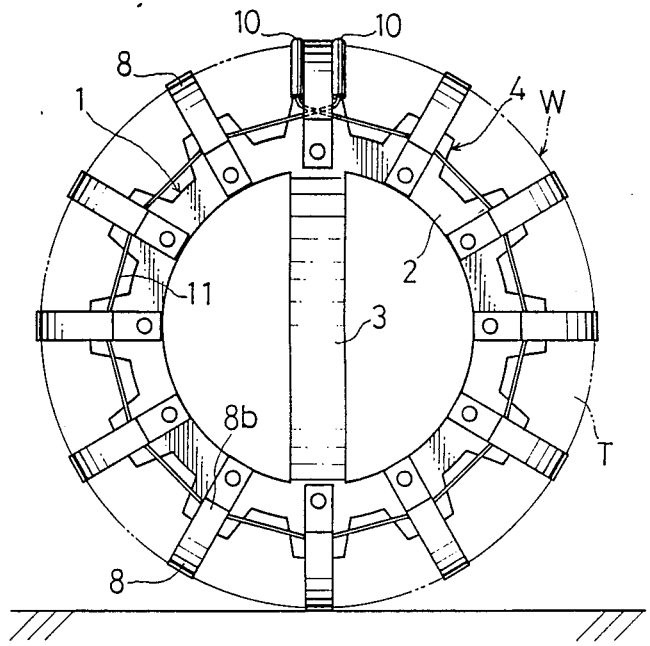
FIG. 5 is a rear view of the antiskid attachment, with the fastening cord fully tightened.
Figure 6:
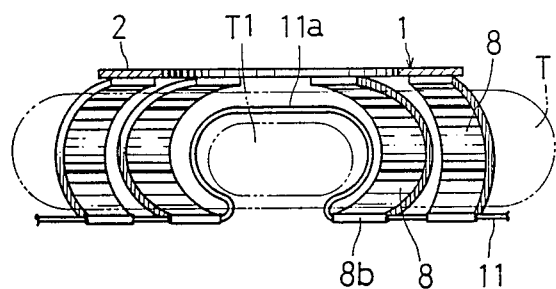
FIG. 6 is a sectional view taken along line VI—VI of FIG. 4.

Assuming that the arm 7 has been pulled up to a laterally extending position, and further assuming that the hooking member 13 is disengaged from the tying slot 7a, the fastening cord 11 is loosened to release the free ends 8b of the ground-engaging band members 8. In order to facilitate the mounting of the antiskid attachment S to the wheel W, two adjacent band members 8 to be positioned across a ground-engaging portion T1 of the tire T are tilted forward and rearward, respectively, in a direction away from the ground-engaging portion T1 (FIG. 4), and the fastening cord 11 extending between the two tilted band members 8 is drawn out to provide a loose loop end 11a. Thereafter, the band members 8 are positioned around the tire T with the loop end 11 extended about the ground-engaging portion T1 (FIG. 6), and the loop portion of the fastening cord 11 is brought inwardly of the tire T along with the band members 8 except those two tilted band members 8. The fastening cord 11 is slightly pulled to thereby pull the free ends 8b of the band members 8 centripetally of the wheel W. The hooking member 13 is then engaged in one of the tying slots 7a near the proximal end of the arm 7, and the arm 7 is pulled down to temporarily tighten the fastening cord 11, thereby temporarily retaining the antiskid attachment S on the wheel W (FIG. 4). Then, the automobile is moved slightly forward until the wheel W passes the forwardly tilted band member 8 and the loop end 11a of the fastening cord 11. The two tilted band members 8 are then replaced to their normal positions, and the loop and 11a of the fastening cord 11 is brought inwardly of the tire T. The arm 7 is then pulled up, and the hooking member 13 and thence the fastening cord 11 are further drawn. The hooking member 13 is then engaged with another one of the tying slots 7a near the distal end of the arm 7 in accordance with the size of the wheel W, and the arm 7 is again pulled down to tighten the fastening cord 11 under the biasing force of the springs 12. Thus, the free ends 8b of the band members 8 are pulled centripetally of the wheel W and are tensioned around the tire T (FIG. 5).

The antiskid attachment S can be removed from the wheel W by reversing the above procedure. First, the arm 7 is pulled up and the hooking member 13 is disengaged from the tying slot 7a. The fastening cord 11 is loosened to thereby release the free ends 8b of the ground-engaging band members 8. The ban members 8 and the loop portion of the fastening cord 11 are pulled outwardly of the tire T, except the band members 8 which are in contact with the ground and a part of the fastening cord 11 which is held by the grounded band members 8. The base plate 1 is tilted outwardly of the wheel W about the grounded band members 8. With the base plate 1 in the tilted position, the automobile is moved slightly forward to thereby release the grounded band members 8 and the part of the fastening cord 11. Thus, all of the band members 8 and the whole fastening cord 11 are drawn outside of the wheel W.

From the foregoing description, it can be appreciated that the antiskid attachment S constructed as described above may be readily mounted to and removed from the wheel W by suitably tensioning and releasing the ground-engaging band members 8 through the tightening and loosening operation of the fastening cord 11. Thus, the antiskid attachment S may be mounted to and removed from the wheel W in a simple manner, without requiring much labor and yet without jacking up the wheels.

Moreover, when the antiskid attachments S are mounted to the wheels W, the ground-engaging band members 8 are effective to increase the rolling resistance of the wheels W and prevent skidding of the wheels W during driving on a snowy road or sands.

Especially, according to the preferred embodiment of the present invention, the ground-engaging band members 8 are formed into a circularly curved shape which substantially conforms to the cross-sectional configuration of the tire T and are disposed in the circumferential direction of the tire T. Therefore, the band members 8 may be reliably and yet easily mounted over the tire T. Further, as the ends of the fastening cord 11 drawn outwardly of the base plate 1 can be operated outside of the tire T, the tensioning and releasing operations of the band members 8 can be simplified, thereby simplifying the mounting and removing procedures of the attachment S to and from the wheel W.

Furthermore, as the arm 7 for tying the fastening cord 11 thereto has the plural tying slots 7a, the antiskid attachment S can be mounted to various sizes of wheels in a reliable manner by selectively engaging the fastening cord 11 in the tying slots 7a. Thus, the antiskid attachment S is applicable to a variety of wheel sizes.

While the invention has been described with reference to a preferred embodiment thereof, it is to be understood that modifications or variations may be easily made without departing from the spirit of this invention which is defined by the appended claims.

What is claimed is:

1. An antiskid attachment for use with an automotive wheel having a tire thereon, comprising:
    a base plate adapted to be positioned on one side of the wheel;
    a plurality of peripherally spaced-apart ground engaging band members mounted on said base plate in cantilevered manner and adapted to be positioned on the outer surface of the tire, each of said ground-engaging band members having a transversely extending hole formed in the free end thereof;
    a fastening cord passed through said holes of said ground-engaging band members for releasably tensioning said ground-engaging band members; and
    tying means for releasably tying said fastening cord to the outside surface of said base plate with said ground-engaging band members tensioned by said fastening cord wherein said tying means comprises an arm pivotally mounted on the outside surface of said base plate and having a plurality of tying slots therein, and a hooking member fixed to both ends of said fastening cord through a pair of springs and selectively engageable with said tying slots of said arm.

2. The antiskid attachment as defined in claim 1 wherein said ground-engaging band members are made of plastic material and flexible to be tensioned about the tire in the transverse direction thereof.

* * * * *